F. H. SCHROEDER.
Corn Sheller.
No. 47,988. Patented May 30, 1865
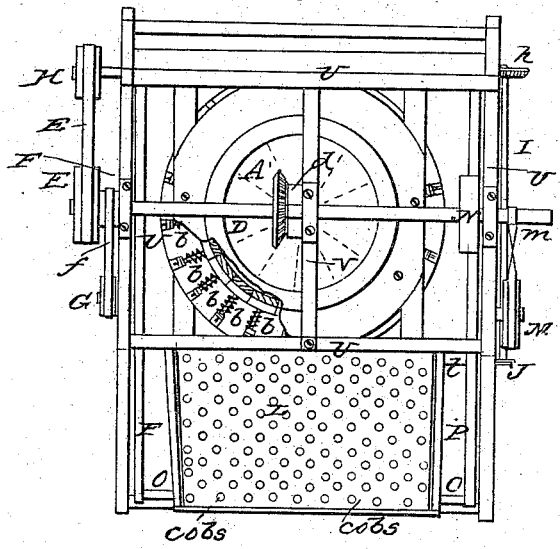
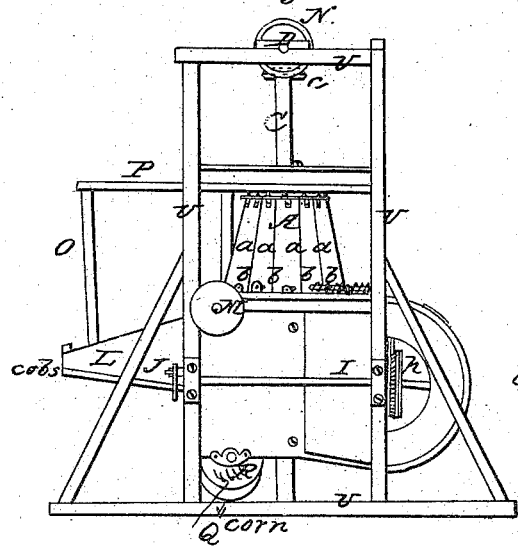
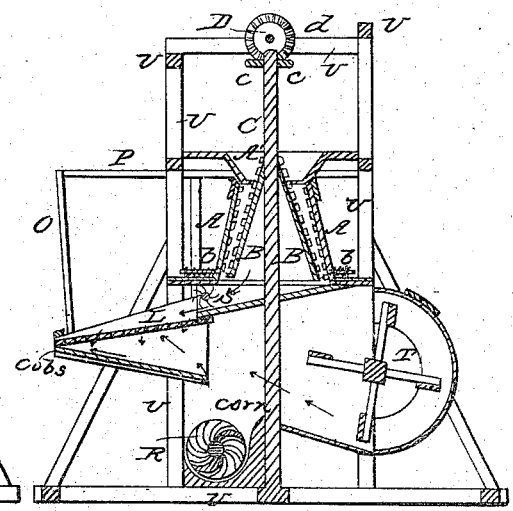
Witnesses:
W. E. Mans
L. L. Coburn
Inventor.
F. H. Schroeder

UNITED STATES PATENT OFFICE.

FREDERICK H. SCHROEDER, OF BUSHNELL, ILLINOIS.

IMPROVEMENT IN CORN-SHELLERS.

Specification forming part of Letters Patent No. 47,988, dated May 30, 1865.

*To all whom it may concern:*

Be it known that I, FREDERICK H. SCHROEDER, of Bushnell, in the county of McDonough and State of Illinois, have invented a new and useful Improvement in Corn-Shellers; and I do hereby declare that the following is a full, clear, and exact description of the same, reference being made to the accompanying drawings and the letters and figures marked thereon, which form part of this specification.

In said drawings, Figure 1 represents a plan or top view of my invention. Fig. 2 is a side elevation of the same, and Fig. 3 is a central vertical section thereof at the line $x$ in Fig. 1.

The nature of my invention consists—

First, in constructing the cone surrounding the burr or revolving interior cone in sections, each section being hinged at the top, and having a separate adjustment by means of springs or any other suitable elastic device, so as perfectly to adjust the machine to cobs of different sizes, and thoroughly and entirely shell the corn from all the cobs alike.

Second, my invention consists in the employment of a novel device at the spout or passage through which the corn and cobs pass out from the shelling device, to regulate the exit of the corn from the sheller and break the force or velocity with which it issues, so as to prevent its scattering and flying off from the screen which receives both corn and cobs and separates them, as hereinafter described.

Third, my invention consists in casting or constructing the interior cone of the sheller solid, provided with a central hole for receiving the shaft which carries it, and giving said interior cone a vertical adjustment, so as to adapt the machine to small corn or large, as the case may be, by sliding said cone up or down upon the shaft, and also in having the apex of said cone extend up into the hopper, so as by its action to agitate the ears of corn therein and prevent the same from clogging or choking up.

Fourth, my invention consists in removing the ordinary cross-frame for supporting the upper end of the shaft of the cone from the hopper, where it is usually placed, and where it continually impedes and clogs up the entrance of the corn into the machine, and extending the shaft up above the hopper and supporting it in suitable bearings, thus avoiding the difficulty of clogging up and the necessity of constantly stirring the corn in the hopper by hand, as in ordinary machines.

To enable those skilled in the art to understand the construction and operation of my invention, I will proceed to describe the same with particularity, making reference in so doing to the aforesaid drawings.

Similar letters of reference in the several figures indicate corresponding parts of my invention.

A represents the sectional exterior conical inclosure surrounding and inclosing the conical burr B, said exterior cone being stationary and provided with an interior roughened or toothed surface corresponding to the similar exterior surface of the cone B. Said exterior conical inclosure is made in vertical sections, (marked $a$ $a$ in the drawings,) each of said sections being hinged to a flange upon the lower part of the circular hopper, (marked A',) and being held in position at their lower ends solely by the operation of the springs $b$ $b$ or their equivalent, as by an elastic band or hoop passing around said cone A, or any other appropriate device which would allow each of said sections $a$ to yield separately when circumstances might require it, and would return it to its original position when the occasion for its expansion is past. I adjust the staves $a$, which form the concave A, by means of the rods $o$, thus increasing or diminishing the space between the concave A and cone B. One end of each of said rods is fastened firmly to one of the staves $a$, and the other end passes out through the shoulder $p$. Upon this end of the rod there is a nut, $q$. By turning the nuts $q$ the bottoms of the staves $a$ are moved and the size of the concave increased or diminished. This can be done when the machine is in operation. This adjustment by means of the rods $o$ does not interfere with the separate and independent movement of the staves $a$, as the rods $o$ slide freely through the shoulders $p$ whenever the passage of anything through the machine requires a temporary enlargement of the space between the cone B and concave A, and when the cause of such enlargement passes out of the machine the springs $d$ restore the staves $a$ to the position, as regulated by the nuts on the rods $o$.

C represents the vertical shaft carrying the cone B, provided near its upper end, which is supported in the cross-beam V, (seen in Fig.

1,) with the bevel-gear wheel c, which gears with the similar wheel, d, upon the horizontal shaft D, provided with the drum N, whereby the machine is operated. Said shaft D is also provided with the two drums E and F, which, by means of the belts e and f, respectively, passing around the drums G H, impart motion to the fan T and the spiral conveyer R, which carries the corn out from the machine into its appropriate receiver. By means of suitable beveled gearing upon the shaft of the fan and the shaft I at h, and the eccentric J and pitman-rod l, a suitable vibratory motion is given to the screen L, upon which the shelled corn and cobs fall when they issue from the sheller, and through which the corn falls upon the inclined board beneath and fall into the conveyer R, to be carried out of the machine. The aforesaid driving-shaft D, by means of the belt m and the drum M, imparts the desired revolving motion to the regulator or check-valve S at the exit-passage from the shelling-cone. Said regulator is constructed by attaching to the shaft a series of flexible strips of leather or canvas, one edge of said strips being fastened longitudinally to the shaft, the other extending outward radially, so that while the regulator is stationary the outlet is closed; but when revolving, the shelled corn and cobs are allowed to pass out gradually or with diminished force and velocity, thus allowing the corn to pass out rapidly enough, yet controlling the issue in the manner and for the purposes described.

The cone B is adjusted at the desired point upon the shaft and fastened by means of set-screws or any other suitable device.

By extending the vertical posts U above the top of the hopper and arranging the cross-bar V, to support the upper end of the shaft E, the cross-support in the hopper is obviated; but it is also possible to drive the machine by connection or gearing with the shaft D, above the hopper, instead of below it, which would be much less convenient.

Having described my improvement in corn-shellers, I will now specify what I claim as new therein and desire to secure by Letters Patent.

The employment of the stop-valve S, provided with flexible flanges, when constructed and operating substantially as herein described.

F. H. SCHROEDER.

Witnesses:
W. E. MARRS,
L. L. COBURN.